United States Patent
Murray et al.

(10) Patent No.: US 11,960,624 B2
(45) Date of Patent: Apr. 16, 2024

(54) SYSTEMS AND METHODS TO ENHANCE PRIVACY THROUGH DECISION TREE BASED SUPPRESSION RULES ON RELATIONAL DATABASES

(71) Applicant: IMMUTA, INC., College Park, MD (US)

(72) Inventors: John Reilly Murray, Crofton, MD (US); Joseph James Regensburger, Grove City, OH (US); Alfred Vincent Rossi, Hilliard, OH (US); Mason Sharp, Holmdel, NJ (US)

(73) Assignee: IMMUTA, INC., College Park, MD (US)

( * ) Notice: Subject to any disclaimer, the term of this patent is extended or adjusted under 35 U.S.C. 154(b) by 567 days.

(21) Appl. No.: 17/179,648

(22) Filed: Feb. 19, 2021

(65) Prior Publication Data

US 2021/0264057 A1    Aug. 26, 2021

Related U.S. Application Data

(60) Provisional application No. 62/979,845, filed on Feb. 21, 2020.

(51) Int. Cl.
| | |
|---|---|
| *G06F 21/62* | (2013.01) |
| *G06F 16/2453* | (2019.01) |
| *G06F 16/2455* | (2019.01) |
| *G06F 16/28* | (2019.01) |
| *G06N 5/01* | (2023.01) |

(52) U.S. Cl.
CPC .... *G06F 21/6254* (2013.01); *G06F 16/24534* (2019.01); *G06F 16/24564* (2019.01); *G06F 16/284* (2019.01); *G06N 5/01* (2023.01)

(58) Field of Classification Search
CPC .................................................. G06F 21/6254
USPC ........................................................ 726/27
See application file for complete search history.

(56) References Cited

U.S. PATENT DOCUMENTS

| | | | |
|---|---|---|---|
| 7,698,250 | B2 | 4/2010 | Dwork et al. |
| 8,291,509 | B2 | 10/2012 | Kerschbaum et al. |
| 8,375,030 | B2 | 2/2013 | Rane et al. |
| | | (Continued) | |

OTHER PUBLICATIONS

Notice of Allowance issued in U.S. Appl. No. 16/891,965 dated Nov. 2, 2022, 15 pages.

(Continued)

*Primary Examiner* — Dant B Shaifer Harriman
(74) *Attorney, Agent, or Firm* — MH2 TECHNOLOGY LAW GROUP, LLP

(57) ABSTRACT

Systems, methods, and computer program products are configured to apply k-anonymity to an answer to a query sent to a relational database. A query to the relational database is obtained, the relational database containing a plurality of records. A frequency of occurrence of the attributes in the relational database is determined, an anonymization rule set is created based on the frequency of occurrence of the attributes, the anonymization rule set defining which attributes are to be suppressed in the answer to the query, the anonymization rule set is used to generate the answer to the query, wherein the answer to the query has k-anonymity, and a display or other device is controlled based on the answer to the query.

20 Claims, 16 Drawing Sheets

(56) References Cited

U.S. PATENT DOCUMENTS

| | | | |
|---|---|---|---|
| 8,589,443 B2* | 11/2013 | Cormode | G06Q 50/01 |
| | | | 707/784 |
| 8,600,895 B2* | 12/2013 | Felsher | G06Q 30/0283 |
| | | | 705/50 |
| 8,661,047 B2 | 2/2014 | Talwar et al. | |
| 9,554,203 B1 | 1/2017 | Pavlidi et al. | |
| 9,955,277 B1 | 4/2018 | Alexandridis et al. | |
| 10,467,234 B2 | 11/2019 | Nerurkar et al. | |
| 10,572,673 B2* | 2/2020 | Nishitani | G06F 1/187 |
| 10,599,867 B2 | 3/2020 | Bhowmick et al. | |
| 10,803,197 B1 | 10/2020 | Liao et al. | |
| 10,922,315 B2 | 2/2021 | Jeong et al. | |
| 10,983,960 B2* | 4/2021 | Faith | G06Q 30/0631 |
| 11,003,694 B2* | 5/2021 | Kenedy | G06F 16/9538 |
| 11,055,432 B2 | 7/2021 | Hockenbrocht et al. | |
| 11,068,520 B1 | 7/2021 | Neumann et al. | |
| 11,163,904 B2 | 11/2021 | Barbas et al. | |
| 11,698,990 B2 | 7/2023 | McFall et al. | |
| 2002/0143289 A1 | 10/2002 | Ellis et al. | |
| 2007/0288427 A1 | 12/2007 | Ramer et al. | |
| 2009/0287837 A1* | 11/2009 | Felsher | G06F 21/6245 |
| | | | 709/229 |
| 2010/0268719 A1* | 10/2010 | Cormode | G06Q 30/02 |
| | | | 707/E17.046 |
| 2013/0159021 A1* | 6/2013 | Felsher | G16H 10/60 |
| | | | 705/3 |
| 2013/0246342 A1* | 9/2013 | Faith | G06F 16/164 |
| | | | 707/607 |
| 2015/0156578 A1 | 6/2015 | Alexandridis et al. | |
| 2015/0286827 A1 | 10/2015 | Fawaz et al. | |
| 2016/0224804 A1* | 8/2016 | Carasso | G06F 16/2322 |
| 2017/0235974 A1 | 8/2017 | Zhang et al. | |
| 2018/0004978 A1* | 1/2018 | Hebert | G06F 16/2457 |
| 2018/0247072 A1 | 8/2018 | Hind | |
| 2018/0349384 A1 | 12/2018 | Nerurkar et al. | |
| 2018/0349473 A1* | 12/2018 | Smith | G06F 16/3329 |
| 2019/0026489 A1 | 1/2019 | Nerurkar et al. | |
| 2019/0065775 A1 | 2/2019 | Klucar, Jr. et al. | |
| 2019/0138743 A1 | 5/2019 | Nerurkar et al. | |
| 2019/0266354 A1* | 8/2019 | Banerjee | G06F 16/93 |
| 2019/0318121 A1 | 10/2019 | Hockenbrocht et al. | |
| 2019/0362007 A1 | 11/2019 | Jeong et al. | |
| 2020/0074107 A1 | 3/2020 | Barbas et al. | |
| 2020/0167313 A1* | 5/2020 | Isoda | G06F 16/144 |
| 2020/0380159 A1 | 12/2020 | Lilly et al. | |
| 2021/0264057 A1* | 8/2021 | Murray | G06F 16/284 |
| 2021/0397733 A1 | 12/2021 | Lilly et al. | |
| 2023/0058906 A1* | 2/2023 | Jansen | G06F 21/6254 |

OTHER PUBLICATIONS

Office Action issued in U.S. Appl. No. 17/352,276 dated Apr. 12, 2023, 21 pages.

Office Action issued in U.S. Appl. No. 16/891,965 dated May 24, 2022, 14 pages.

Notice of Allowance issued in U.S. Appl. No. 17/352,276 dated Jul. 28, 2023, 11 pages.

* cited by examiner

300

| ID | Occupation | City | State | Initial Partition | Second Partition | Third Partition |
|---|---|---|---|---|---|---|
| 1 | Lawyer | Washington | DC | $D_2$ | $D_{22}$ | N/A |
| 2 | Lawyer | Washington | DC | $D_2$ | $D_{22}$ | N/A |
| 3 | Lawyer | Hamlet | OH | $D_1$ | $D_{11}$ | $D_{112}$ |
| 4 | Accountant | Hamlet | OH | $D_1$ | $D_{11}$ | $D_{112}$ |
| 5 | Farmer | Hamlet | OH | $D_1$ | $D_{11}$ | $D_{111}$ |
| 6 | Farmer | Hamlet | OH | $D_1$ | $D_{11}$ | $D_{111}$ |
| 7 | Lawyer | Columbus | OH | $D_1$ | $D_{12}$ | N/A |
| 8 | Accountant | Withamsville | OH | $D_1$ | $D_{12}$ | N/A |
| 9 | Accountant | Whately | MA | $D_2$ | $D_{21}$ | N/A |
| 10 | Accountant | Washington | DC | $D_2$ | $D_{21}$ | N/A |
| 11 | Accountant | Bellevue | KY | $D_2$ | $D_{21}$ | N/A |

| ID | Occupation | City | State | Initial Partition | Second Partition | Third Partition |
|---|---|---|---|---|---|---|
| 1 |  |  |  | $D_2$ | $D_{22}$ | N/A |
| 2 |  |  |  | $D_2$ | $D_{22}$ | N/A |
| 3 |  | Hamlet | OH | $D_1$ | $D_{11}$ | $D_{112}$ |
| 4 |  | Hamlet | OH | $D_1$ | $D_{11}$ | $D_{112}$ |
| 5 | Farmer | Hamlet | OH | $D_1$ | $D_{11}$ | $D_{111}$ |
| 6 | Farmer | Hamlet | OH | $D_1$ | $D_{11}$ | $D_{111}$ |
| 7 |  |  |  | $D_1$ | $D_{12}$ | N/A |
| 8 |  |  |  | $D_1$ | $D_{12}$ | N/A |
| 9 | Accountant |  |  | $D_2$ | $D_{21}$ | N/A |
| 10 | Accountant |  |  | $D_2$ | $D_{21}$ | N/A |
| 11 | Accountant |  |  | $D_2$ | $D_{21}$ | N/A |

FIG. 4B

| Partition ID | Rule | Release Occupation | Release City | Release State |
|---|---|---|---|---|
| $D_{111}$ | (STATE = OH) AND (CITY=Hamlet) AND (OCCUPATION = Farmer) | Yes | Yes | Yes |
| $D_{112}$ | (STATE = OH) AND (CITY=Hamlet) AND (OCCUPATION = Farmer) | No | Yes | Yes |
| $D_{12}$ | (STATE = OH) AND (CITY=HAMLET) | No | No | Yes |
| $D_{21}$ | (STATE = OH) AND (OCCUPATION=Accountant) | Yes | No | No |
| $D_{22}$ | (STATE = OH) AND (OCCUPATION <> Accountant) | No | No | No |

FIG. 6

```
SELECT occupation, state, city, COUNT(*) as group_count
FROM my_table
GROUP BY occupation, state, city;
```

```
SELECT
CASE WHEN NOT (
    (state <> 'OH' AND occupation = 'Accountant') OR
    (state = 'OH' AND city = 'Hamlet'
        AND occupation = 'Farmer'))
    THEN NULL ELSE occupation END AS occupation,
CASE WHEN NOT (state = 'OH') THEN NULL ELSE state END AS state,
CASE WHEN NOT (state = 'OH' AND city = 'Hamlet') THEN NULL ELSE
city END AS city,
COUNT(*) as group_count
FROM my_table
GROUP BY 1, 2, 3;
```

FIG. 7

| ATTRIBUTE | VALUE | COUNT | COMPLEMENT COUNT |
|---|---|---|---|
| OCCUPATION | ACCOUNTANT | 5 | 6 |
| CITY | WASHINGTON | 3 | 8 |
| STATE | OH | 6 | 5 |

FIG. 12D

| Attribute Disclosure RULE | Initial | After $D_{111}$ | After $D_{112}$ | After $D_{12}$ | After $D_{21}$ | After $D_{22}$ |
|---|---|---|---|---|---|---|
| CITY | FALSE | FALSE OR (STATE=OH AND CITY = Hamlet) | FALSE OR (STATE=OH AND CITY = Hamlet) | FALSE OR (STATE=OH AND CITY = Hamlet) | FALSE OR (STATE=OH AND CITY = Hamlet) | FALSE OR (STATE=OH AND CITY = Hamlet) |
| STATE | FALSE | FALSE OR (STATE=OH) | FALSE OR (STATE=OH) | FALSE OR (STATE=OH) | FALSE OR (STATE=OH) | FALSE OR (STATE=OH) |
| OCCUPATION | FALSE | FALSE OR (STATE=OH AND CITY = Hamlet AND OCCUPATION = Farmer) | FALSE OR (STATE=OH AND CITY = Hamlet AND OCCUPATION = Farmer) | FALSE OR (STATE=OH AND CITY = Hamlet AND OCCUPATION = Farmer) | FALSE OR (STATE=OH AND CITY = Hamlet AND OCCUPATION = Farmer) OR (STATE <> OH AND OCCUPATION = Accountant) | FALSE OR (STATE=OH AND CITY = Hamlet AND OCCUPATION = Farmer) OR (STATE <> OH AND OCCUPATION = Accountant) |

SYSTEMS AND METHODS TO ENHANCE PRIVACY THROUGH DECISION TREE BASED SUPPRESSION RULES ON RELATIONAL DATABASES

CROSS-REFERENCE TO RELATED APPLICATIONS

This application claims the benefit and filing date of U.S. Provisional Application No. 62/979,845 filed on 21 Feb. 2020, which is hereby incorporated by reference in its entirety.

BACKGROUND

The volume and variety of personal data being recorded and stored by organizations places personal privacy at risk. Regulations such as the Health Insurance Portability and Accountability Act (HIPAA) Privacy Rule, General Data Protection Regulation (GDPR) Recital 26, and European Medicine Agency (EMA) Rule 0070 have been adopted in an effort to protect the privacy of personal data. Each of these regulations require that to avoid restrictions upon sharing and reuse personal data be anonymized or pseudo-anonymized, such that the data cannot reasonably be associated with an individual. Satisfying anonymization requirements is challenging, particularly when considering how identity can be inferred using seemingly innocuous attributes such as birth year, postal code, gender, ethnicity, occupation, etc. These attributes, known as indirect identifiers or quasi-identifiers (QIDs), effectively allow a third party to determine a person's identity by process of elimination. In order to assess how likely an individual can be re-identified, previous techniques introduced the concept of k-anonymity, which characterizes the degree of protection of the data against such attacks. A dataset is said to have the property of k-anonymity (for the given value of k) where k is defined as the cardinality of the smallest group (or cohort) when the dataset is partitioned into distinct groups of records over all QID values. In some examples, datasets which exhibit k-anonymity can be referred to as k-anonymous. Intuitively, the larger the value of k, the more difficult it is to infer the person associated with a given record, as there are at least k−1 other individuals in the same dataset with matching QIDs.

Anonymization techniques can be designed to increase k of a dataset, by grouping together similar cohorts to form a large set of indistinguishable records. This is done by either generalizing or suppressing values of certain attributes. For example, generalization techniques for cities could be represented by less specific administrative regions such as counties, states, or countries. Suppression techniques would remove values entirely, for example removing low population zip codes entirely. By affecting the disclosed attributes using generalization and/or suppression, the k-anonymity of a dataset can be increased.

Existing conventional relational databases typically cannot maintain k-anonymity for responses to queries when the contents of the relational database changes. For many database applications, new records may be continually added and/or deleted from the relational database, which can cause the data anonymity of answers to queries to fall below a desired minimum level; for example, the k value can fall below the desired minimum when a record(s) is removed from or added to the database. Accordingly, what is needed is a system embodying a computer-implemented process that can be utilized to dynamically apply a specified level of k-anonymity to the results or answers to queries sent to a relational database under changing conditions, thus maintaining a desired level of anonymity or privacy regardless of database changes.

SUMMARY

Embodiments consistent with the present invention include systems, processes and computer program products are configured to apply k-anonymity to an answer to a query sent to a relational database. A query to the relational database is obtained, the relational database containing a plurality of records. A frequency of occurrence of the attributes in the relational database is determined, an anonymization rule set is created based on the frequency of occurrence of the attributes, the anonymization rule set defining which attributes are to be suppressed in the answer to the query, the anonymization rule set is used to generate the answer to the query, wherein the answer to the query has k-anonymity, and a display or other device is controlled based on the answer to the query.

In some embodiments described herein, the anonymization rule set is used by the system to generate the answer to the query having k-anonymity.

BRIEF DESCRIPTION OF THE DRAWINGS

The accompanying drawings, which are incorporated into and constitutes a part of this specification, illustrate some implementations of the invention and together with the description, serve to explain the principles of the invention.

FIGS. 4A and 4B illustrate example data from a database and data with some of the attributes suppressed according to embodiments disclosed herein.

FIG. 6 illustrates a rule set according to embodiments herein.

FIG. 7 illustrates an example table according to embodiments herein.

FIG. 12D illustrates an example max count table according to embodiments disclosed herein.

FIG. 13C illustrates an evolution of example disclosure rules according to embodiments disclosed herein.

DETAILED DESCRIPTION

Figure 1:
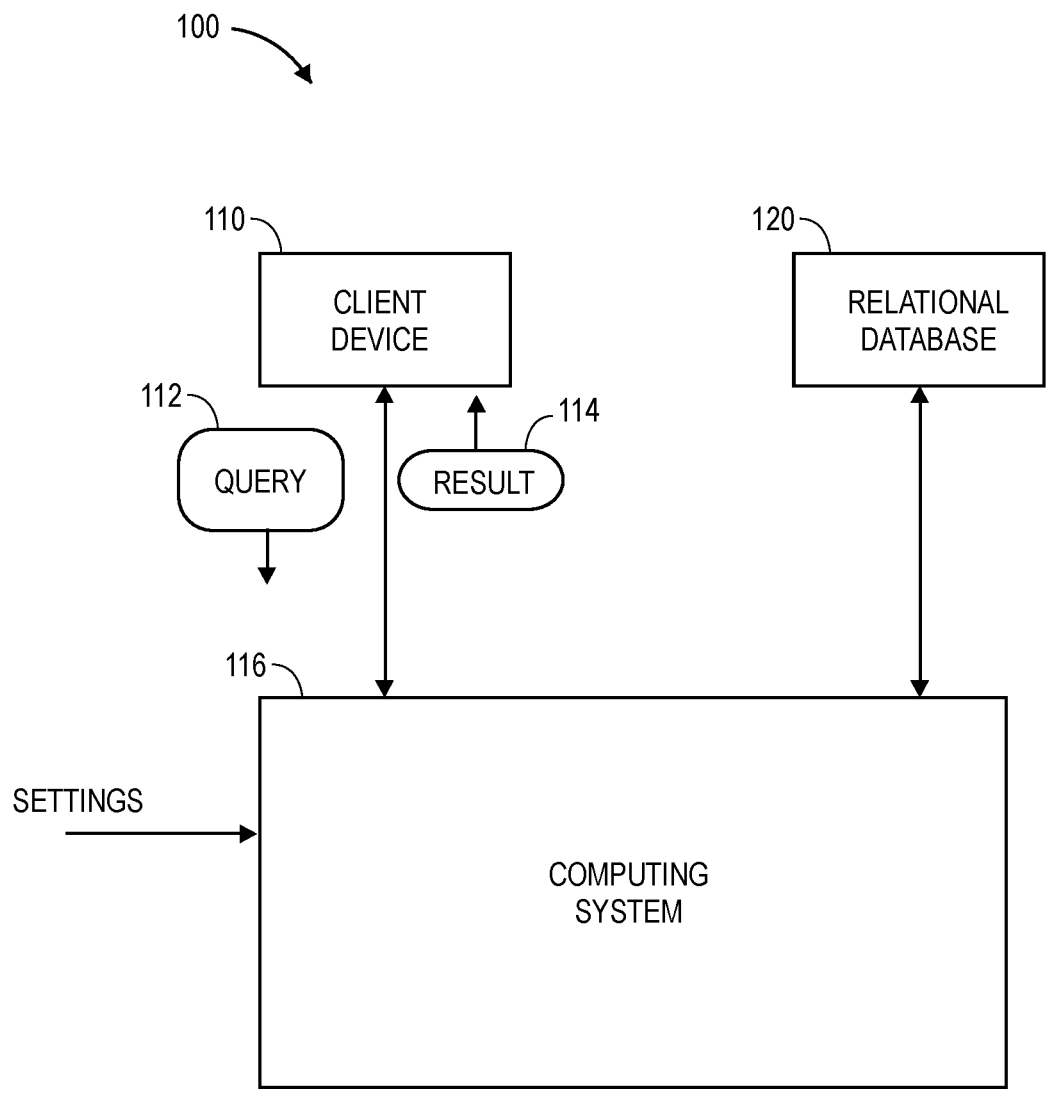
FIG. 1 illustrates a block diagram of an example of an environment for implementing systems and methods in accordance with aspects of the present disclosure.

In practice, achieving anonymization or pseudo-anonymization requires making it difficult to associate individual records with high certainty to individual people. Identity disclosure is when an outside party can confidently identify a subject or respondent from a dataset. A first line of defense involves removing all directly identifying attributes such as names, social security numbers, and account numbers from released data. For many practical applications, simply removing or masking direct identifiers in data is not sufficient to protect against identity disclosure, due to the presence of quasi-identifiers.

As previously noted, some existing conventional relational databases implement k-anonymity for responses to queries. As also noted, however, such conventional relational databases typically cannot always maintain a needed level of k-anonymity because the contents of the relational database changes over time. For example, the database may continuously add and/or delete new data, and the new data may have new or additional attributes that were not present in previous data held in the database; for example, a person may be added who resides in a U.S. state different from the states of residence of all the other persons in the database. In such a situation, disclosure of the state of residence of that person may result in the k-anonymization of the answers to queries falling below the k level needed to maintain anonymity.

The embodiments of systems and methods described herein k-anonymize outgoing data using the changed contents of the database, determining which attributes to suppress to achieve the needed k-anonymity in the results or answers to queries, which is difficult to implement.

The property of k-anonymity characterizes the degree of protection of a dataset against linking on quasi-identifiers, (or QIDs). In practice, k-anonymity is measured by first identifying the set of QIDs. Individuals are then grouped into cohorts or groups, where each cohort is comprised of records with the same value for the set of QIDs. For example, the set of all unmarried female patients, aged 40-50, within the state of Wisconsin could define a cohort. The value of k in k-anonymous release (i.e., the release of data from the database in response to a query or the like) is then defined as the number of individuals contained in the smallest cohort. In practice, the re-identification probability of any single record is 1/k, with larger values of k resulting in a reduced re-identification probability, which corresponds to more privacy.

The value of k can be increased by suppressing or generalizing released attributes. For example, gender may be suppressed (e.g., by deleting) for a small cohort, effectively doubling the cohort size; alternatively, a set of small, nearby postal codes can be associated together (generalized), for example by replacing those postal codes with the name of the metropolitan area, thereby increasing cohort size. In practice, an organization may define some minimum value of k (such as 11) and the embodiments described herein may suppress and/or generalize attributes until that minimal value of k is achieved across all cohorts.

There are numerous methods to produce a k-anonymous release. Broadly, these methods can be categorized into two classes: global and local methods. Global methods define a rule(s) to generalize or suppress an attribute(s) which applies uniformly across all records. Suppressing gender and releasing the first three digits of a US postal code for all records would be an example of global methods.

Local methods suppress or generalize attributes in a manner that depends on the contents of each record. For example, it may be permissible to disclose the occupation attribute for lawyers in Washington D.C., but not in a small locality such as Hamlet, Ohio, because the small number of lawyers in Hamlet, Ohio does not allow for enough k-anonymity. Global methods are generally simple to implement in a system but over-coarsen the data release, which makes the data release less useful. Local methods provide more information content, but can be difficult to implement in a system, and the privacy protections are fragile to the introduction of new data, (which terminology includes the removal of existing data). In all cases, there are numerous schemes that can be employed to achieve a k-anonymous release. Various embodiments described herein define a series of rules, preserve a useful amount of information content in the data, adjust the rules to handle additional data being added to (or deleted from) the database, and/or can be applied across numerous relational database technologies.

In some embodiments described herein, a system, a method, or a computer program product can utilize a Decision Tree (DT) data structure. A DT is a composite structure, built using a series of binary decisions. When applied to a dataset, the DT partitions the data into a series of non-overlapping groups (called partition elements), where each record in a dataset is mapped to one and only one partition element.

In some embodiments, the k-anonymity condition is achieved from the DT with the application to three operations. One example operation can include terminating the DT when a partition cannot be found that divides the dataset into two partition elements, each having at least k records. Another example operation can include extracting the conditions for each partition element. Another example operation can include releasing only the values of attributes which are homogenous (i.e. singled-valued) for the records within a given partition element.

FIG. 1 illustrates a block diagram of an example of a system or an environment 100 for implementing systems and methods in accordance with aspects of the present disclosure. The environment 100 may include a client device 110, a computing system 116, and a relational database 120.

In one usage example, a user may use the client device 110 to send a query 112 (e.g., a request for data from a database) to the computing system 116, which provides a result 114. Computing system 116, in accordance with aspects of the present disclosure, may be configured to receive the query and to communicate with the relational database 120. The computing system may be further configured to provide a result 114 to the client device 110, where the result is k-anonymous in accordance with embodiments disclosed herein. The computing system 116 may be configured to receive settings (e.g., from a system administrator or another computer), such as a value of k and other process control parameters (see FIG. 10), which may be used to affect the creating, calculating, and/or providing the k-anonymous result 114.

Figure 2:
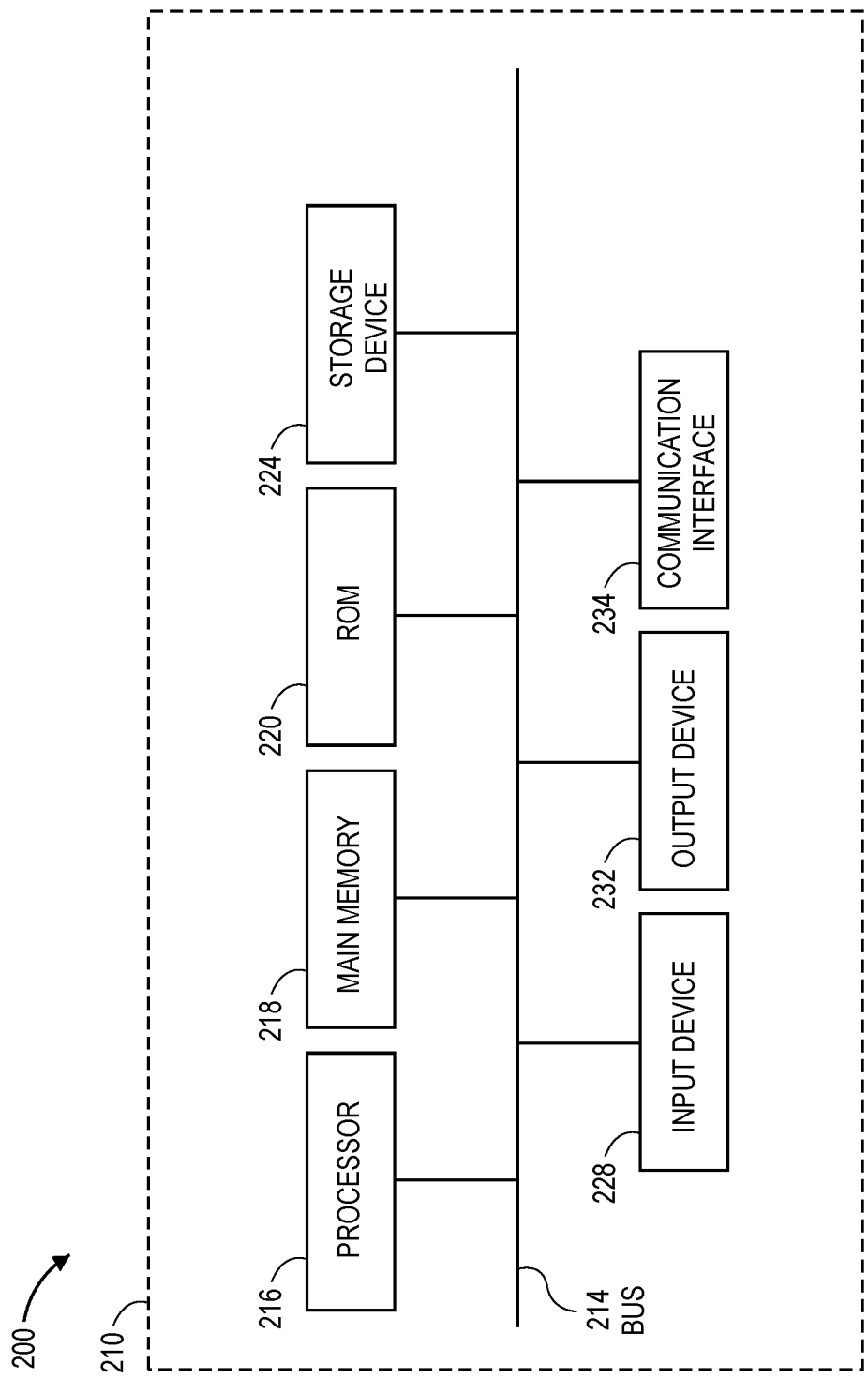
FIG. 2 illustrates a system block diagram illustrating an example of a computing system, in accordance with aspects of the present disclosure.

FIG. 2 shows a system block diagram illustrating an example of further details of the computing system 116 of FIG. 1, illustrated as computing system 200, in accordance with aspects of the present disclosure. As shown in this example, the computing system 200 includes a computing device 210 capable of communicating via a network, such as the Internet. In example embodiments, the computing device 210 may correspond to a mobile communications device (e.g., a smart phone or a personal digital assistant (PDA)), a portable computer device (e.g., a laptop or a tablet computer), a desktop computing device, a server, etc. In some embodiments, the computing device 210 may host programming and/or an application to carry out the providing of the k-anonymous answer or result to the client device 110 as described herein. The computing device 210 is configured to receive and/or obtain the query over communications interface 234, for example.

The computing device 210 may include a bus 214, a processor 216, a main memory 218, a read only memory (ROM) 220, a storage device 224, an input device 228, an output device 232, and a communication interface 234. Bus 214 may include a path that permits communication among the components of device 210. Processor 216 may be or include a processor, a microprocessor, an application specific integrated circuit (ASIC), a field programmable gate array (FPGA), or another type of processor that interprets and executes instructions. Main memory 218 may include a random access memory (RAM) or another type of dynamic storage device that stores information or instructions for execution by processor 216. ROM 220 may include a ROM device or another type of static storage device that stores static information or instructions for use by processor 216. Storage device 224 may include a magnetic storage medium, such as a hard disk drive, or a removable memory, such as a flash memory.

Input device 228 may include a component that permits an operator to input information to device 210, such as a control button, a keyboard, a keypad, or another type of input device. Output device 232 may include a component that outputs information to the operator, such as a light emitting diode (LED), a display, or another type of output device. Communication interface 234 may include any transceiver-like component that enables device 210 to communicate with other devices or networks. In some implementations, communication interface 234 may include a wireless interface, a wired interface, or a combination of a wireless interface and a wired interface. In embodiments, communication interface 234 may receive computer readable program instructions from a network and may forward the computer readable program instructions for storage in a computer readable storage medium (e.g., storage device 224).

System 200 may perform certain operations, as described in detail below. System 200 may perform these operations in response to processor 216 executing software instructions contained in a computer-readable medium, such as main memory 218. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 218 from another computer-readable medium, such as storage device 224, or from another device via communication interface 234. The software instructions contained in main memory 218 may direct processor 216 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, system 200 may include additional components, fewer components, different components, or differently arranged components than are shown in FIG. 2.

The system may be connected to a communications network (not shown), which may include one or more wired and/or wireless networks. For example, the network may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the communications network may include copper transmission cables, optical transmission fibers, wireless transmission, routers, firewalls, switches, gateway computers and/or edge servers.

The computing device 210 shown in FIG. 2 may be configured to receive or obtain a query 112 and to provide a k-anonymous response thereto. In some examples, the computing device 210 may be configured to develop a rule set to apply to a record(s) in the database as referenced in the query 112 to generate the k-anonymous response or result or answer 114 to the query 112. In some examples, a value for k may be specified and used in developing the k-anonymous answer (result 114) to the query, as further described herein.

One of ordinary skill will recognize that the components, arrangement, and implementation details of the computing system 116, 210 are examples presented for conciseness and clarity of explanation. Other components, implementation details, and variations may be used, including adding, combining, or subtracting components and functions. Additionally, the functionality carried out by the computing system 116, 210 could be performed by the relational database 120.

Figure 3:
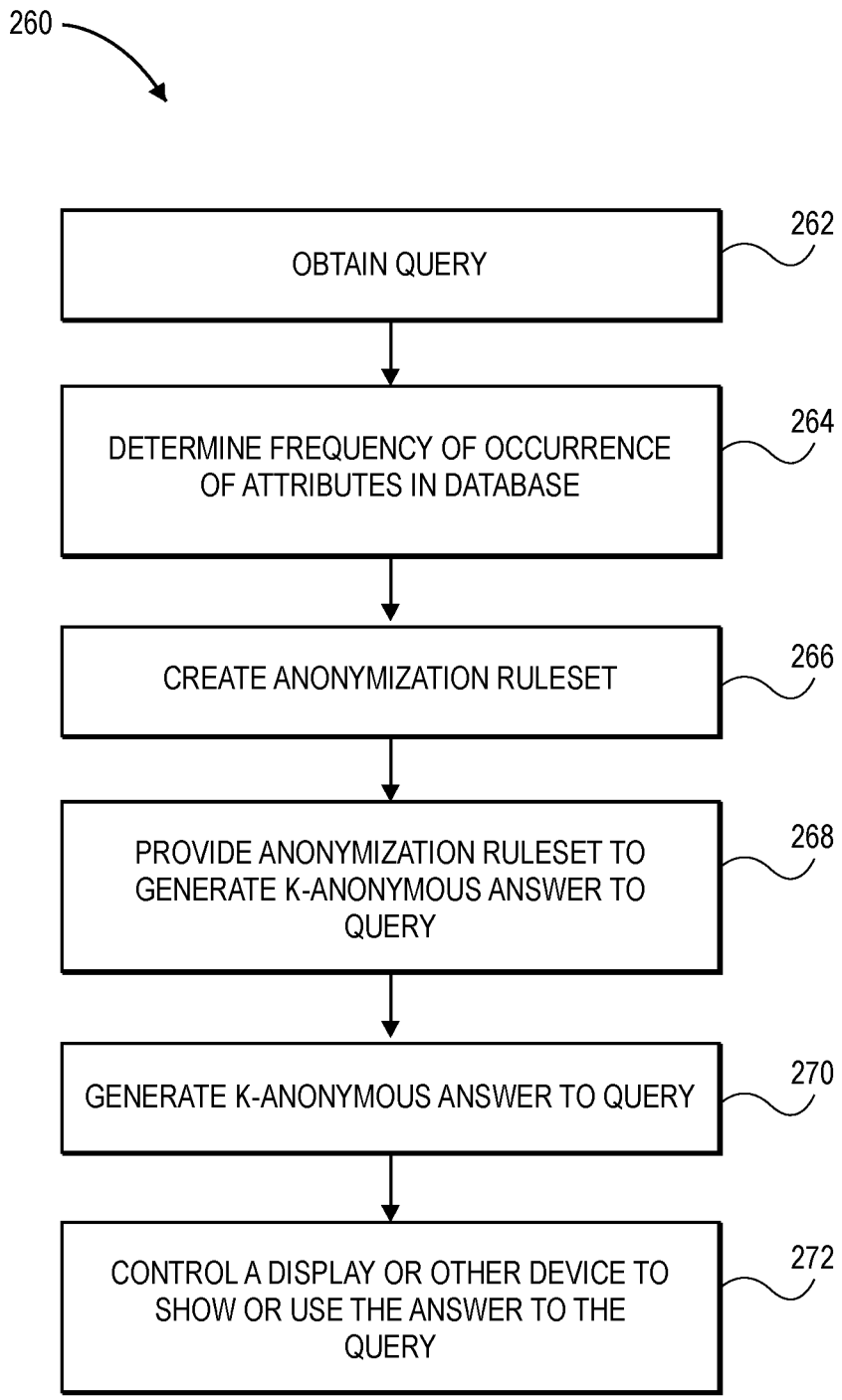
FIG. 3 illustrates a flowchart illustrating operations of the disclosed systems and processes in accordance with aspects of the present disclosure.

FIG. 3 illustrates a flowchart of an example of a process 260 in accordance with embodiments of the present invention. In 262, a query to the relational database is obtained. For example, the computing system 116 may receive or otherwise obtain a query 112 from the client device 110.

In 264, a frequency of occurrence of the attributes of the records in the relational database is determined, for example, by the computing system 116. In various embodiments, this may be accomplished by counting the number of times each unique attribute occurs in the database 120. For example, for an attribute indicating a U.S. state where a person or entity resides or is located, the system 116 may count or otherwise determine the number of times each state is listed in the database.

In 266, an anonymization rule set is created based on the frequency of occurrence of the attributes. The anonymization rule set defines which attribute or attributes are to be suppressed, anonymized, or obscured in the answer to the query (e.g., in the results 114). In various embodiments, when the anonymization rule set is applied to the results of the query 112, the rules change the query result 114 such that the result 114 exhibits k-anonymity. Details of how the anonymization rule set is created is further explained herein below.

In 268, the anonymization rule set is provided to be used to generate the answer to or the result of the query, wherein the answer or result to the query has k-anonymity. In some embodiments, operations 264 and 266 may be performed in response to obtaining the query at operation 262, and the computing system 116 may apply the rule set to the query results to generate the k-anonymized result 114 that is provided to the client device 110. In other embodiments, the rule set created in operation 266 may be stored by the computer system 116, and the stored rule set can be used to generate the k-anonymized result 114 each time a query 112 is obtained. In such embodiments, operations 264 and 266 may not be performed in response each time a query is obtained at operation 262; instead operations 264 and 266 may be performed only when there is a change to the database 120 and/or periodically, such as once every 10 minutes, once an hour, twice a day, once a day, once a week, once a month, or the like. Additionally, the system may determine when operations 264 and 266 need to be performed.

In 270, the embodiments disclosed herein generate the k-anonymous answer to the query using the generated rule set as explained herein. The answer can vary depending on the particular dataset. Additionally, the rule set can be updated or changed when data is added or deleted from the database, which can result in a change in the answer (such that the updated or changed rule set provides a different answer).

In 272, the answer can be used to control a display or other device to show or use the answer to the query. For example, the answer can be displayed on a display or other device, or the answer can be configured to control a display or other device. In some embodiments, the answer or result may be configured to be displayed in a particular format, or to be displayed with information in addition to the answer.

One of ordinary skill will recognize that the example of a process 260 shown in FIG. 3 may be changed without departing from the principles of the invention, and operations may be modified, added, removed, or reordered with departing from the principles of the invention. For example, operations 264-268 may occur before operation 262, and the stored rule set may be applied to the query result 114 before the result 114 is supplied to the client device 110. For another example, operation(s) may be added after 268 to: query the relational database 120 per the obtained query 112 (from 262), apply the rule set to the query results for the database 120 to create anonymized results 114, and transmit the anonymized results 114 to the client device 110. Other variations are possible.

FIG. 4A represents an example of a dataset 300 in a relational database, such as relational database 120, in accordance with embodiments of the disclosure. The dataset 300 has a plurality of records shown in rows labeled 1-11 in the "ID" attribute column. In this example, each of the records (i.e., each of the rows) pertain to an entity (which could be an individual person, a group of persons, an organization, etc.). In FIG. 4A, the first column is labeled ID, and this attribute contains an identification number for the entity for each of the corresponding records. In various embodiments, the ID could be a name of a person or entity, an identification number, or any other type of identification that can be associated with the entity. As shown, each record (row) in the dataset 300 has a plurality of attributes. In the example shown in FIG. 4A, the attributes in addition to "ID" are "occupation", "city", and "state". Any number of attributes may be included in a dataset 300, and some of the records may have blank information for one or more of the attributes. In the example of FIG. 4A, the columns labeled "Initial Partition", "Second Partition" and "Third Partition" are not part of the dataset, but instead are used in conjunction with generating a data tree and the rule set, according to embodiments of the disclosure as further explained herein. In various embodiments, the columns "Initial Partition", "Second Partition" and "Third Partition" and the data they contain may be generated and stored by the computing 116 in a manner that associates the partition data with their corresponding record in the dataset 300.

Figure 5:
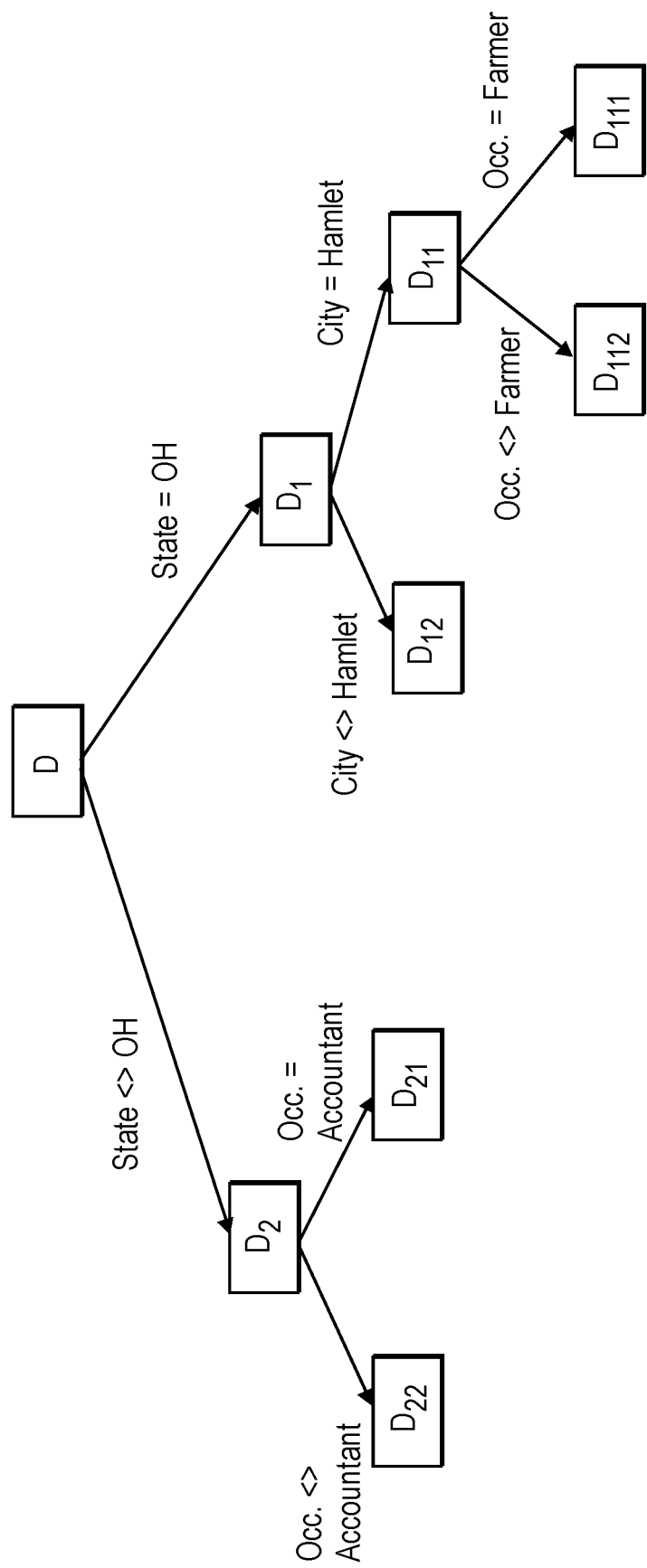
FIG. 5 illustrates an example of a data tree structure according to embodiments disclosed herein.

In accordance with embodiments disclosed herein, the data in dataset 300 of FIG. 4A can be split in a Data Tree as shown in FIG. 5 initially into two sets: $D_1$ and $D_2$, where $D_1$ includes all records for which State is OH and $D_2$ includes all records for which State is not equal to OH, as shown by the Initial Partition column of FIG. 4A. In this example, $D_1$ would include 6 records and $D_2$ would include 5 records. After this initial split, $D_1$ can further be subdivided into two partition elements: $D_{11}$ and $D_{12}$, where $D_{11}$ includes only records for which State is OH and City is Hamlet and $D_{12}$ includes records for which State is OH and City is not Hamlet. Using these rules, $D_{11}$ would have 4 records and $D_{12}$ would have 2 records. Similarly, $D_2$ can be divided into two partition elements $D_{21}$ and $D_{22}$ subject to the criterion Occupation is Accountant for $D_{21}$ and Occupation is not Accountant for $D_{22}$. With these rules $D_{21}$ and $D_{22}$ would have 3 and 2 records, respectively. This process can be continued and terminated based on some set of criteria. FIG. 5 shows the process is continued until each cohort cannot be divided into two sufficiently sized groups. In this example the minimum group size is 2.

For example, in FIG. 4A, setting k equal to 2 would mean terminating the tree example at the nodes for $D_{111}$, $D_{112}$, $D_{12}$, $D_{21}$, and $D_{22}$. The conditional, i.e., the rule, can be extracted by simply identifying each terminal node and creating a composite condition as the product of all edge conditionals in the decision tree.

Referring to FIG. 6, which shows an example of a rule set that may be generated by various embodiments according to the data tree of FIG. 5 from the dataset 300 of FIG. 4A, this is shown as the column labelled "Rule" shows each rule(s) or condition(s). In some examples, the released attribute set (e.g., the anonymized result 114 that the client device is allowed to see) can be defined as the subset of attributes which correspond to the equality conditions (rules) shown, e.g., Dill can be defined, in this example, by the condition STATE=OH AND CITY=HAMLET AND OCCUPATION=FARMER, meaning the values, in the example shown, for OCCUPATION, CITY and STATE can be released. $D_{112}$ can be defined, in some examples, by the condition STATE=OH AND CITY=HAMLET AND OCCUPATION< >FARMER, meaning the values, in some examples, for STATE and CITY can be released, with the attribute for OCCUPATION suppressed.

$D_{12}$ is defined, in the example shown, by the condition STATE=OH AND CITY< >HAMLET, meaning that only the attributes for STATE can be released, with the attributes for CITY and OCCUPATION suppressed. $D_{21}$ is defined, in the example shown, by the condition STATE< >OH AND OCCUPATION=ACCOUNTANT, meaning only the values for the attributes for OCCUPATION can be disclosed, with the attributes for CITY and STATE being suppressed. $D_{22}$ is defined, in the example shown, by the condition STATE=OH AND OCCUPATION< >ACCOUNTANT, meaning only the value for the attributes for STATE can be released, with the attributes for OCCUPATION being suppressed.

Turning back to FIG. 4B, which shows an example of the dataset 300 with certain attributes suppressed according to the rule set of FIG. 6 in order to achieve k-anonymity. In this example, the values for the attribute OCCUPATION have been suppressed, (e.g., removed, anonymized, obscured, or the like) for records 1-4, 7 and 8, the values for the attribute CITY have been suppressed for records 1, 2 and 7-11 and the values for the attribute STATE have been suppressed for the records 1, 2 and 9-11. These attributes were suppressed by applying the rules of FIG. 6 accordingly.

Various embodiments that utilize a rule set to provide k anonymity to the answer (e.g., result 114) to a query (e.g., query 112) made to a relational database have several technical advantages. First, the rule set is comprised of a set of binary conditions. As such, the rule set can be used with many backend database technologies. This means in a common language, such as SQL or C++, determining whether to release each attribute in an answer (or result) to a query can be distilled into a CASE or SWITCH statement. A SQL example of this is shown in FIG. 7. In this example, each queried attribute (QID) is mapped into a CASE statement that conveys whether or not the attribute can be safely disclosed. This remapping assures that any subsequent analysis of the results (e.g., by the user of the client device 110) occurs using safely anonymized QID attributes. Second, the rule set is robust and mostly insensitive to the insertion of new data records into the data set (e.g., 300), even if the new record has some unforeseen value. For example, if a new record inserted into the data set 300 of FIG. 1 included the attributes: (STATE=NJ, CITY=Egg Harbor Township, OCCUPATION=Engineer, ID=12), this would map into the existing $D_{22}$ partition element, because this partition element is defined by the condition (STATE< >OH) AND (OCCUPATION< >Accountant). This would not change the k-anonymous property of the data set 300, despite being augmented with the new record. Since Occupation, State, and City are not explicitly disclosed, this new record can safely be included in $D_{22}$ and its QID attributes are safely suppressed in any query results 114. Third, the tree can be built in parallel, speeding computation. Fourth, the tree can be easily expanded as new data is added. Fifth, the tree and constructed rule set conveys the rules for each cohort in an unambiguous manner, providing end users with predictable results.

In some embodiments, as mentioned previously, the techniques herein may include two distinct phases: Construction of the rule set and Application. Construction defines the process of identifying cohorts and building a rule set. Application involves applying the rule set to data.

Figure 8:
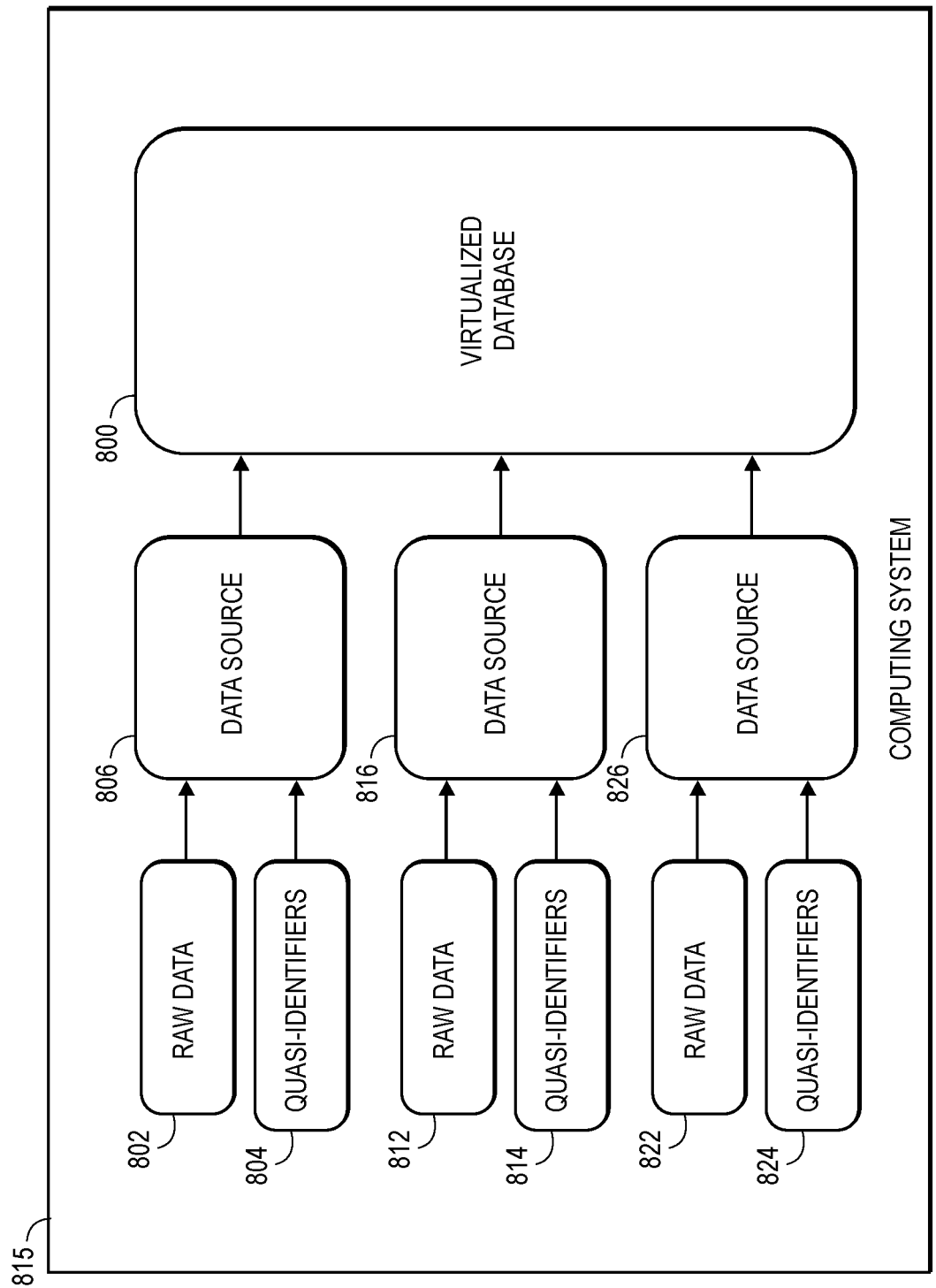
FIG. 8 illustrates a computing system example according to embodiments herein.

FIG. 8 illustrates an example of data organization according to various embodiments of the invention. In some embodiments, Multiple Data Sources (806, 816, and 826) are exposed within a Virtualized Database 800. Each of these data sources can include Raw Data (802, 812, and 822) and a set of Quasi-identifying attributes (804, 814, and 824), among others. FIG. 8 shows three notional data sources, but this can be extended to an arbitrary number of data sources. In various embodiments, the Raw Data (802, 812, 822) can be part of or drawn from any relational database management system (RDBMS), including but not limited to Microsoft SQL Server, PostgreSQL, MySQL, Apache Impala, Teradata, or the like.

Figure 9:
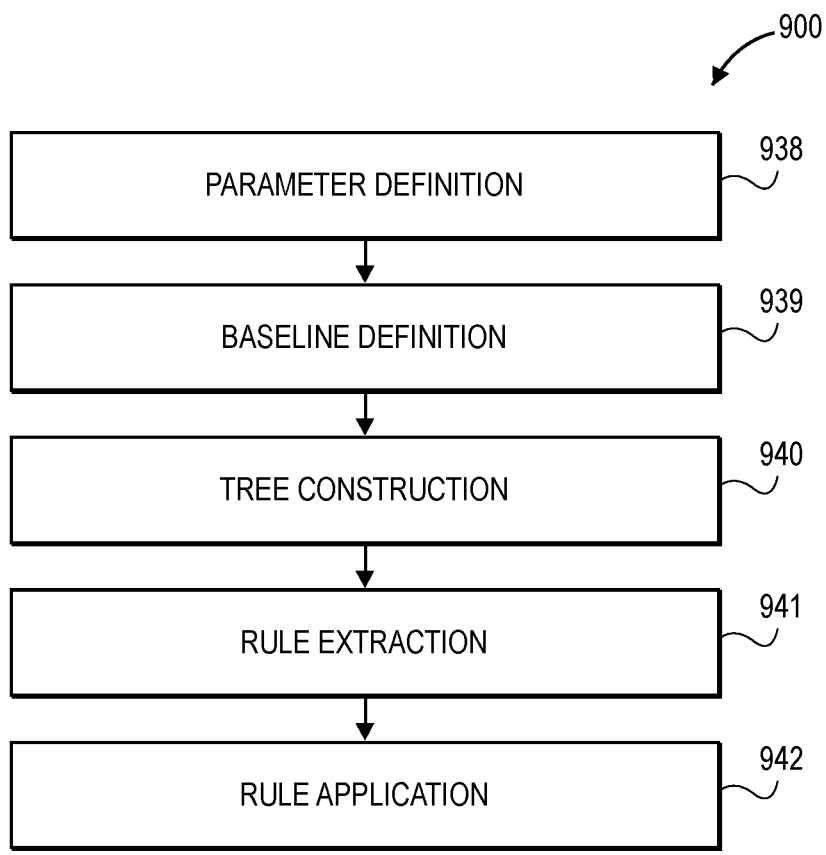
FIG. 9 illustrates an example of a flowchart for the k-anonymization rule process according to embodiments herein.

In some embodiments, with an established data framework, the k-anonymization rule process can be divided into five primary steps, shown in the example of a flow diagram 900 of FIG. 9. The Parameter Definition 938 process can define the objectives and controls which should be predefined before the process is executed. These parameters can serve to control the process, making sure that the process will satisfy the k-anonymity requirement, and that the resulting rule set can be applied to a host of backend technologies. In some embodiments, the Baseline Definition 939 can measure the baseline status of a target data table. This process can, in some examples, identify cohorts which meet some minimal size threshold, and identify which cohorts should be obscured to achieve a k-anonymity constraint. Tree Construction 940 can identify rules that can partition the dataset into meaningful cohorts, while identifying what attributes should be suppressed. In some examples, Rule Extraction 941 can take the tree built during Tree Construction and extract rules from the tree. In some embodiments, Rule Application 942 can apply the resulting rules when a relational database is queried to determine an answer to the query, the answer or result having the k-anonymity.

Figure 10:
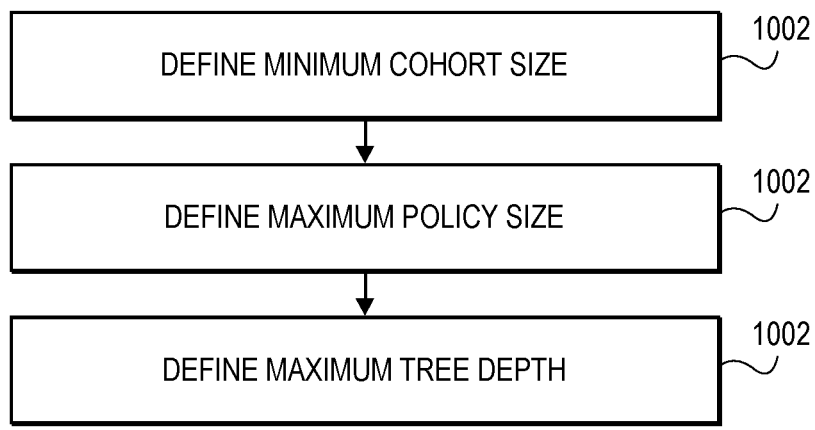
FIG. 10 illustrates an example process for defining control parameters according to embodiments herein.

Once data sources have been exposed, process control parameters can be defined, as shown in FIG. 10. In some embodiments, the process control parameters may be entered or otherwise defined by an administrator of the system 100. For example, an administrator may enter the parameters as settings before generating a rule set for a data set 300 from a database 120. In some embodiments, three parameters can be defined: a minimum cohort size 1002, a maximum policy size 1004, and a maximum tree depth 1006. The minimum cohort size 1002 can define the minimum number of records in any single cohort, such as 6, 7, 8, 9, 10, 11, 12, 20, 50, 100, or the like. The maximum policy size can, in some embodiments, define an upper limit related to the total number of conditions needed to define the cohort set. The maximum policy size is driven by the targeted RDBMS system, for example Snowflake limits queries to sizes less than 1 MB where systems such as MySQL limit queries to 16 MB. The presence of a maximum query size limit assures that the resulting query (an example is shown in FIG. 5) will not exceed the limits of the backing relational database 120 and its management system. In some embodiments, the maximum tree depth 1006 can control how many times a data set can be subdivided into cohorts. The depth of the tree can be a configurable value, with typical depth limits between 10 and 20. Assuming an even split between trees, this means that a dataset could be fragmented into between 210 (1,024) and 220 (1,048,576) distinct cohorts. In some embodiments, at least the minimum cohort size 1002 and either the maximum policy size 1004 or the maximum tree depth 1006 can be defined or preset before the system creates a data-tree-based rules set (FIGS. 5 and 6). The minimum cohort size 1002 can be used to assure that the k-anonymity condition is met, and the maximum tree depth 1006 can assure the policy can be applied on a variety of backing technologies.

Figure 11:
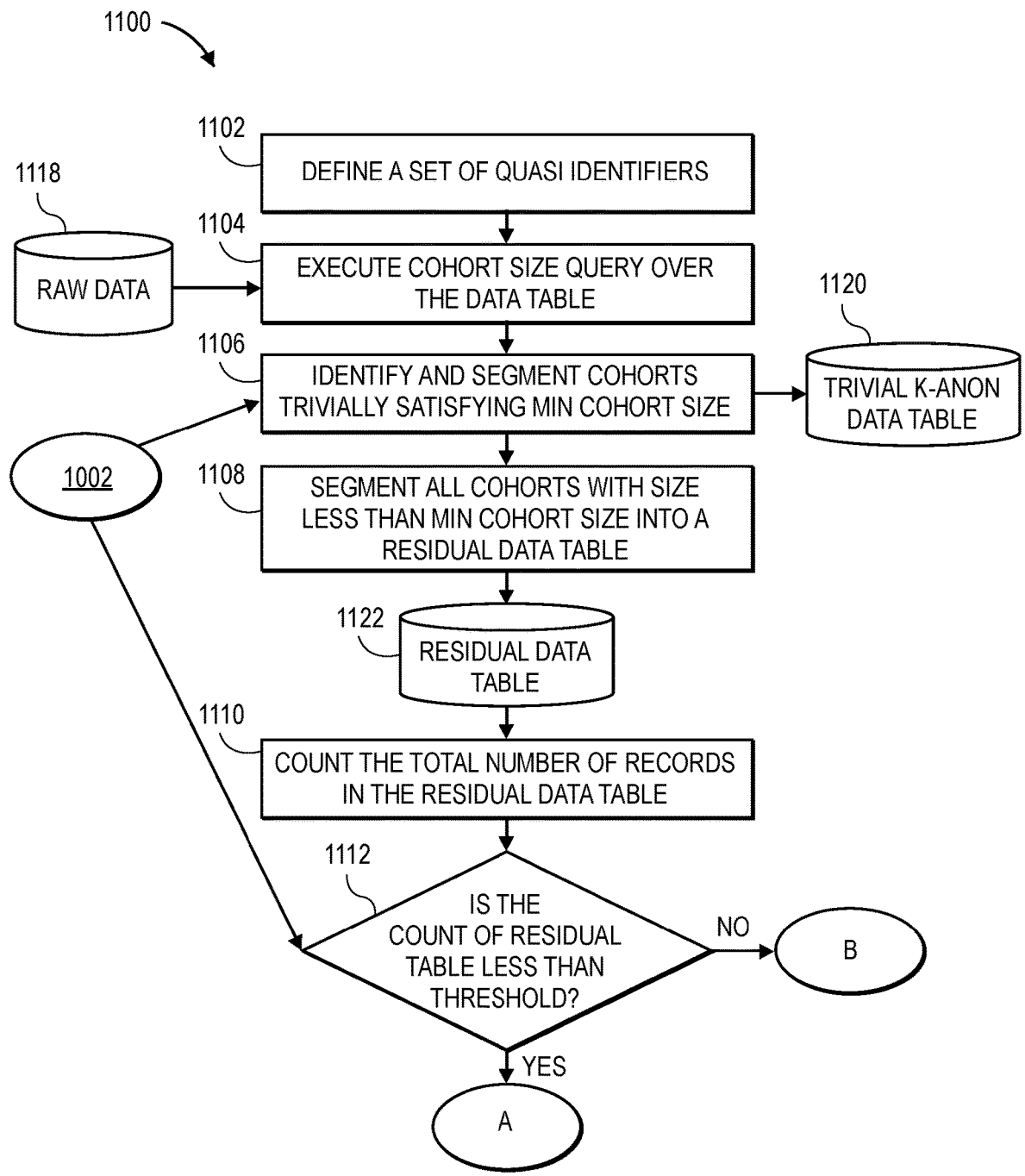
FIG. 11 illustrates an example baseline and filtration process according to embodiments disclosed herein.

FIG. 11 shows an example of a baseline and filtration process 1100. In some embodiments, the raw data must have at least the minimum cohort size 1002 predefined for it. Once a data source is identified that satisfies this constraint, the k-Anonymization process can include first identifying all cohorts within the raw data. In some embodiments, this is done by first allowing an administrator, a user or process to define a set of quasi-identifying attributes in 1102. Once this is done, the data source can be, in some examples, grouped over each distinct set of QID values, counting the number of records per cohort in 1104. Nearly all backing technologies enable this operation through some kind of aggregation operation. For example, a SQL backed technology enables this kind of operation via the GROUP BY operation:
SELECT_QID_1, QID_2, . . . , QID_N, COUNT(*) AS COHORT_SIZE
FROM TABLE_NAME
GROUP BY QID_1, QID_2, . . . , QID_N;

In some embodiments, this operation creates a baseline size estimate for the raw cohorts. Optionally, cohorts which satisfy the minimum cohort size 1002 can be identified and segmented in 1106 into a trivially k-anonymous data table 1120. The trivially k-anonymous data table 1120 can be defined as considered trivially k-anonymous because these records can be disclosed with no additional policies applied to this subset. In some embodiments, the residual data is segmented 1108 into a Residual Data Table 1122. If the optional segmentation 1106 is not run, all data is collected in the Residual Data Table 1122. In some embodiments, the total number of records in this Residual Table is then counted in 1110. In some embodiments, if the Residual Table has at least the minimum number of cohorts, then the process moves onto tree construction (FIG. 12). If this is not satisfied, the process shown in FIG. 11 is executed.

In the example of FIG. 11, the smallest single cohort, in terms of the number of records, can be extracted from the Trivially k-anonymous Table 1120. This cohort can be unified with the Residual Data Table 1122, to create an AUGMENTED RESIDUAL DATA TABLE. This operation assures that the residual data table has enough records to be successfully k-anonymized.

If the optional process represented in FIG. 11 is not run; then RAW DATA 1118 can serve as input for tree construction. In some examples, in the event that the RESIDUAL DATA TABLE 1122 satisfies the minimum count threshold test in 1112, the RESIDUAL DATA TABLE 1122 can serve as input as indicated at A in FIG. 11. In the event that the RESIDUAL DATA TABLE 1122 does not satisfy this test, the RESIDUAL DATA TABLE as augmented can, in some examples, serve as input as indicated at B in FIG. 11.

Figure 12A:
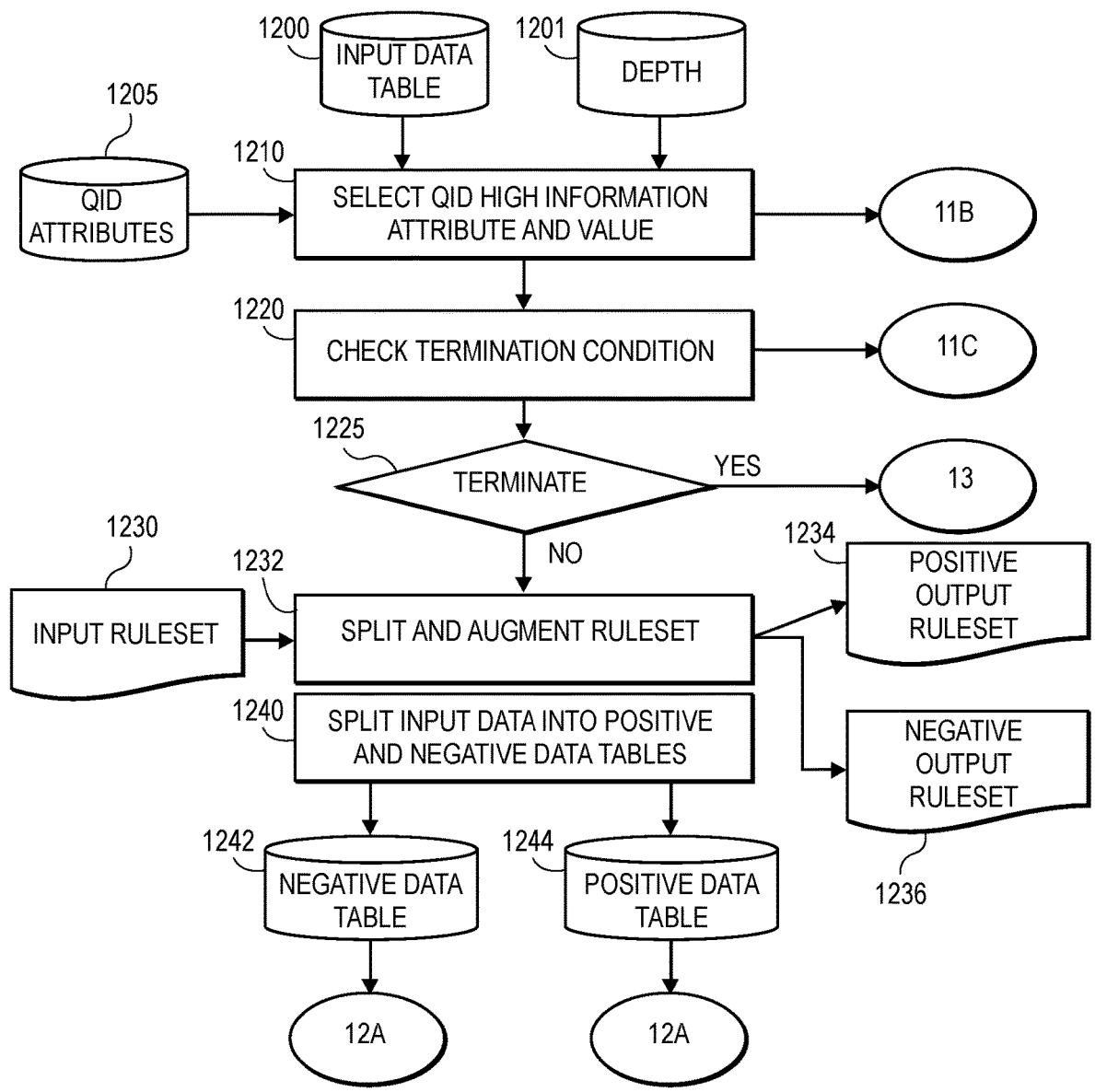
FIGS. 12A, 12B, and 12C illustrate example processes for tree construction according to embodiments disclosed herein.

In some embodiments, an INPUT DATA TABLE 1200 and the DEPTH 1201 are fed into the Tree Construction process, an example of which is represented in FIG. 12A. The DEPTH measures the number of times the INPUT DATA TABLE 1200 has been divided. In some embodiments, initially a HIGH INFORMATION QID ATTRIBUTE AND VALUE are selected 1210, using a process shown in more detailed in FIG. 12B. This process can include selecting a single value, X, to disclose for one attribute, $Q_i$, based on some information criteria. In some examples, this can split the input data 1100 into two non-overlapping cohorts, one consisting only of records where $Q_i$ equals X, and the second consisting only of records for which $Q_i$ is not equal to X. Before partitioning, termination conditions can be checked 1220. This process is shown in more detail in FIG. 12C. In some embodiments, if the termination conditions are met in 1225, with termination occurring if any one of four conditions are met: a cohort cannot be divided into two distinct groups of at least k records, there are no more attributes to be exposed, the depth of the tree exceeds some predetermined threshold (notionally on the order of 10-20), or the policy size exceeds some predetermined, platform-dependent maximum (notionally on the order of 1 MB), the process moves on to Rule Extraction, shown in more detail in FIG. 13. Otherwise, if some INPUT RULE SET 1230 does not exist, the process can include, in some examples, defining an empty set of rules. In some embodiments, the INPUT RULESET SET 1230 can be duplicated into a POSITIVE RULE SET 1234 and a NEGATIVE RULE SET 1236. The POSITIVE RULE SET 1234 can apply to records for which $Q_i$=X, and the NEGATIVE RULE SET 1236 can apply to records for which $Q_i$< >X. In some embodiments, each of these can be augmented in 1232 with a new rule, based on the selected partition criteria.
POSITIVE RULE SET=POSITIVE RULE SET+(Disclose $Q_i$ if $Q_i$=X)
NEGATIVE RULE SET=NEGATIVE RULE SET+(SUPPRESS $Q_i$ if $Q_i$< >X)

In conjunction with the rule set augmentation, the data table can be split, in some examples, into two partition elements in 1240, creating a NEGATIVE DATA TABLE 1242 and a POSITIVE DATA TABLE 1244. The NEGATIVE DATA TABLE 1242 and the NEGATIVE RULE SET 1236 can be fed, once again, back into the Tree Construction Process, shown in FIG. 12A. In some examples, the POSITIVE DATA TABLE 1244 and the POSITIVE RULE SET 1234 can also be fed back into the Tree Construction Process of FIG. 12A. For both cases, the DEPTH 1201 can be incremented by one, in some examples, and fed back into the process of FIG. 12A.

In some embodiments, this process iterates until each branch terminates. As such for each pass through the process, the number of partition elements can double, continually subdividing the overall dataset into closely associated sub-partitions. In some examples, with each partition element, the rule set can:
1) Define a compound condition for membership, and
2) Create a list of attributes which can be disclosed for the partition element.

In some embodiments, in order to be disclosed, a given partition element must have some equality condition extracted from step 1232. In some embodiments, this means that, by definition, a partition consisting of a single partition element will contain no disclosures. This partition element can be defined as the fallback cohort. In some embodiments, the existence of this fallback cohort can guarantee that new data with unobserved attribute values can be added to the data table without risk of violating the k-anonymity constraint.

Figure 12B:
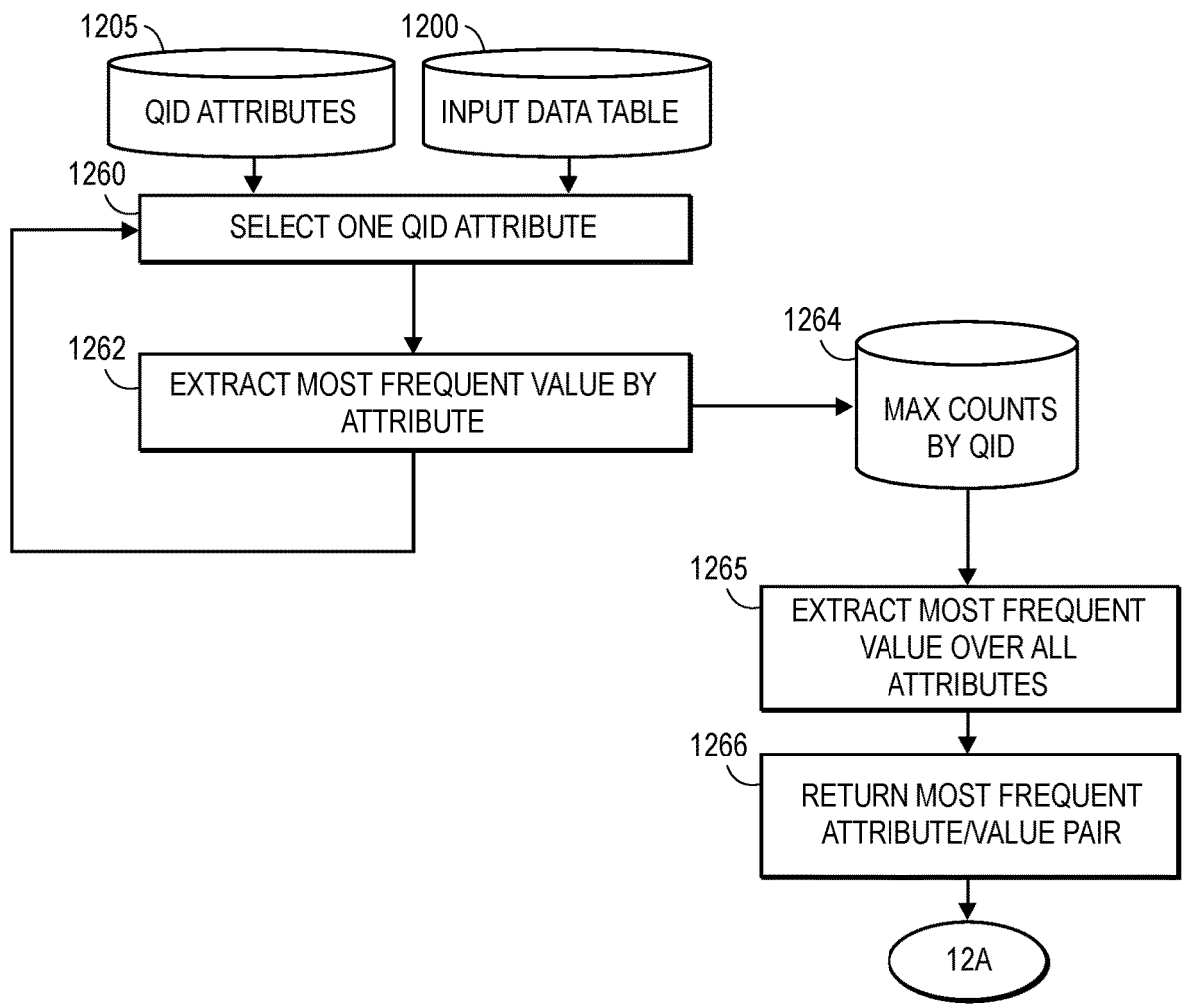
Figure 13A:
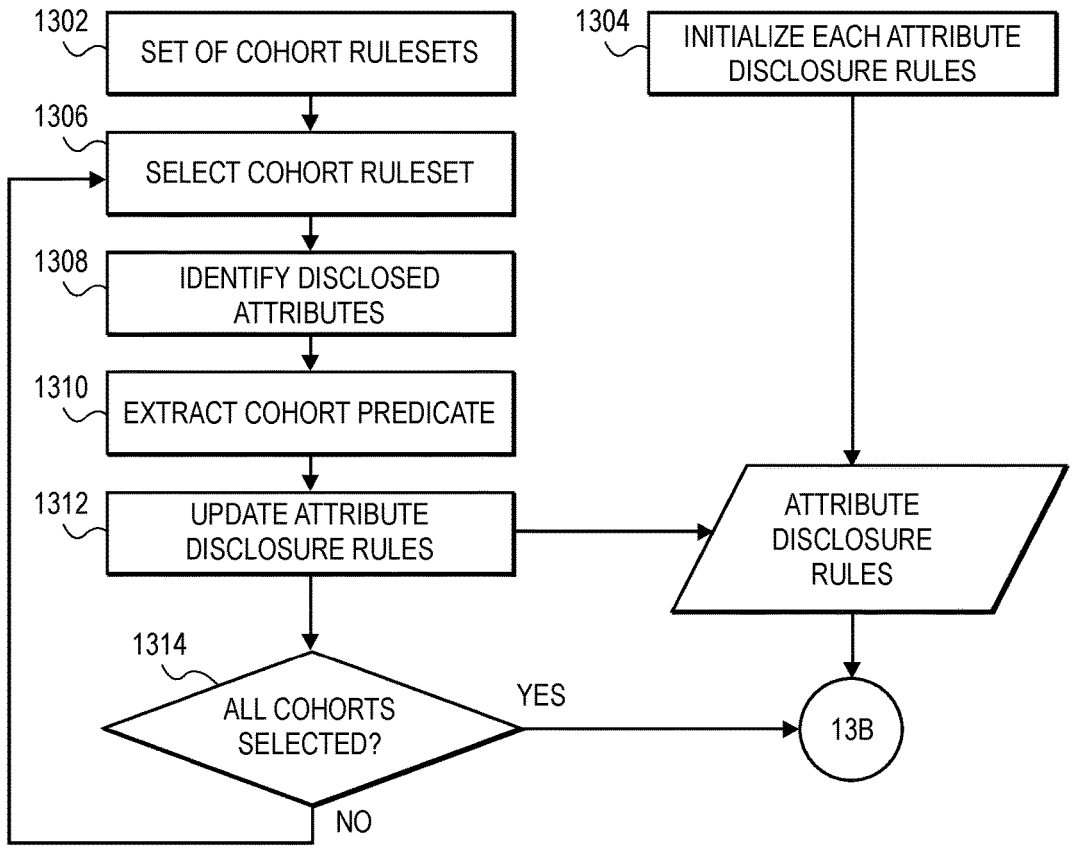
FIGS. 13A and 13B illustrate rule extraction processes according to embodiments disclosed herein.

FIG. 12B demonstrates how the HIGH INFORMATION QID can be chosen in 1210 of FIG. 12A. Using the input data table 1210 and QID attributes 1205 as attributes, the process can select, in some examples, one QID attribute in 1260 and identify the most frequently occurring value for that attribute in 1262. In some embodiments, this process can be repeated, selecting each attribute once. For each attribute, the most frequently occurring value can be added to a MAX COUNT BY QID table in 1264. After the QIDs are processed, the attribute/value pair with the highest counts, e.g. most frequent, can be selected, with the constraint that the complement of this pair has counts greater than or equal to $K_{min}$. In some embodiments, this constraint can ensure that the complementary cohort satisfies the k-anonymity constraint. In 1265, the most frequent value over all attributes is extracted. The result can be returned to the Tree Construction Process of FIG. 12A in 1266.

To illustrate this process, consider the data shown in FIG. 4A. The resulting MAX COUNT TABLE is shown in FIG. 12D. This shows the three attributes (OCCUPATION, CITY, STATE), the most frequent value for each as VALUE, the number of records where Q=X as COUNT, and the number of records where Q< >X as COMPLEMENT COUNT. When K=2, all attribute/value pairs in this example satisfy the complementary class criteria. The most frequent attribute/value pair is STATE/OH. In the event of ties, the choice is somewhat arbitrary. A sophisticated process could be used to select the attribute based on subsequent partitions. In some examples, the process includes selecting the first pair in the list. This is seen here where CITY=WASHINGTON is chosen over CITY=HAMLET. In the event no pairs satisfy the complementary count or count criteria, an empty pair can be returned.

Figure 12C:
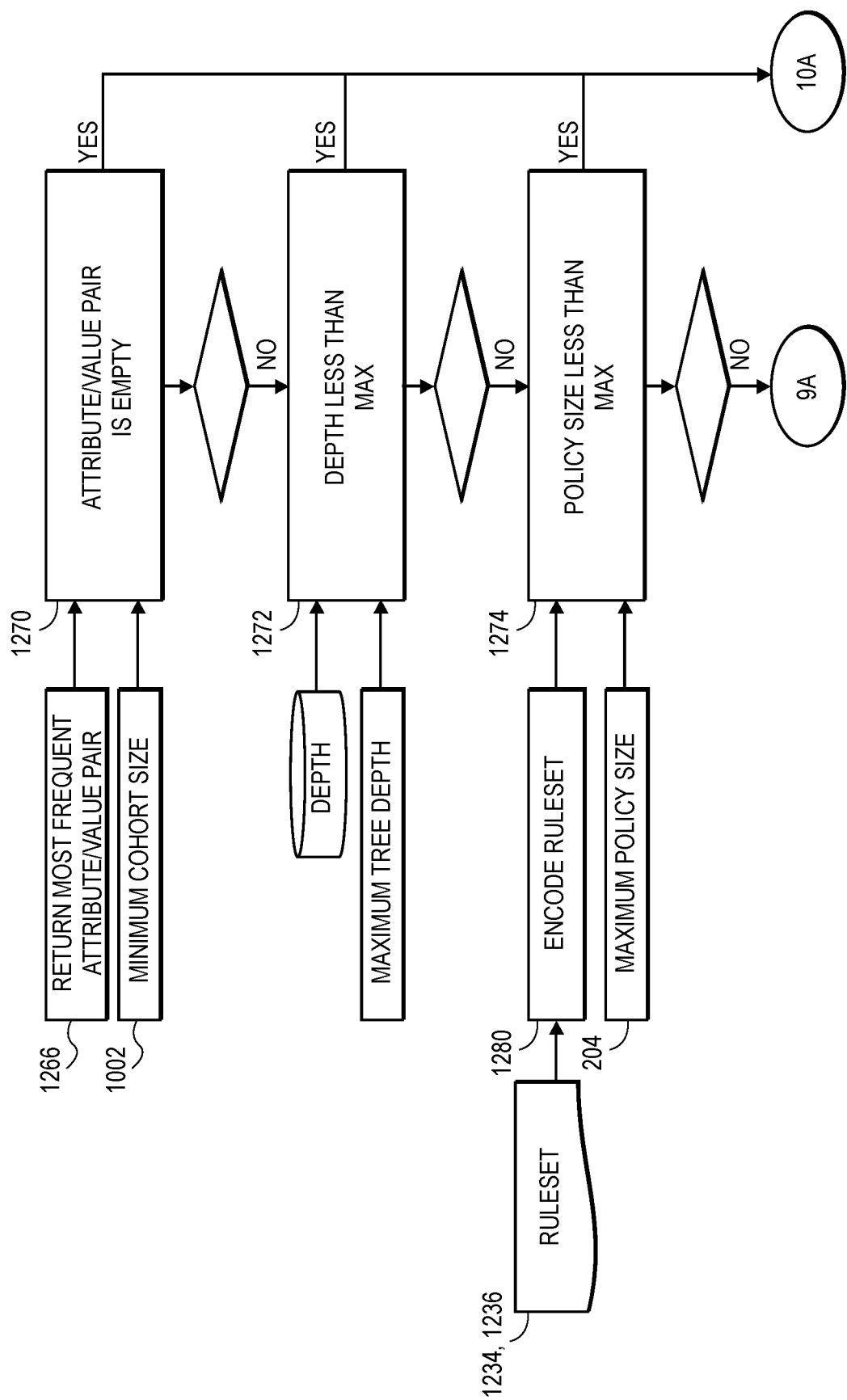

FIG. 12C shows the evaluation of termination conditions. In some embodiments, if the ATTRIBUTE/VALUE pair is empty in 1266, this denotes that no split could be made on the data while satisfying the minimum cohort size constraint 1002. This is checked in 1270. If the pair is empty, the process can be terminated and the RULE EXTRACTION begins, shown in FIG. 13. Otherwise, the TREE DEPTH 1101 can be compared to the maximum tree depth 1006. In some embodiments, if the depth is greater than the maximum in 1272, the process is terminated and the RULE EXTRACTION begins (shown in FIG. 13). Otherwise, the RULESET (1234 for positive partition elements or 1236 for negative partition elements) can be encoded at 1280. This is compared to the maximum policy size 1004. In some embodiments, if the resulting policy exceeds the predefined maximum in 1274, the process is terminated and the RULE EXTRACTION begins, shown in FIG. 13A. Otherwise, the tree construction process continues, as shown in FIG. 12A.

In some embodiments, the RULE EXTRACTION phase 941 can extract the set of conditions under which an attribute can be disclosed. Using the example shown in FIGS. 4A and 4B, the OCCUPATION attribute can be disclosed under the following conditions:
  If STATE=OH AND CITY=Hamlet AND OCCUPATION=Farmer, OR
  IF STATE< >OH AND OCCUPATION=Accountant
as shown in FIG. 6.

In some examples, the RULE EXTRACTION phase 941 attempts to use the cohorts which have been identified in the TREE CONSTRUCTION phase 940 and generates disclosure rules for each QID attribute. This process has two sub-processes, identifying attribute disclosure rules (shown in FIG. 12A) and simplifying attribute disclosure rules, shown in FIG. 12B.

In some embodiments, the process for identifying attribute disclosure rules (e.g., the rule extraction process implementation shown in FIG. 13A) starts by first referencing the SET OF COHORT RULESETS 1302, produced by the TREE CONSTRUCTION 940 phase. Next, or in parallel, the process can include INITIALIZING EACH ATTRIBUTES DISCLOSURE RULES in 1304. Using the example in FIG. 4A and FIG. 4B, the initial disclosure rule is:
  STATE: False
  CITY: False
  OCCUPATION: False
This means that each attribute defaults to being suppressed. In some examples, the process SELECTS A COHORT RULESET in 1306. This ruleset can define:
  A set of predicates; and
  A set of disclosed attributes.

Using the example shown in FIG. 4A, FIG. 4B and FIG. 6, cohort D111 can be defined, in the embodiment shown, by the following predicates and disclosed attributes:
  $P_1$: STATE=OH AND
  $P_2$: CITY=Hamlet AND
  $P_3$: OCCUPATION=Farmer
  Discloses: {STATE, CITY, OCCUPATION}

Similarly, $D_{21}$ can be defined, in the embodiment shown, by the following predicates and disclosed attributes:
  $P_1$: STATE< >OH AND
  $P_2$: OCCUPATION=Accountant
  Discloses: {OCCUPATION}(note that the initial disclosure rule above is that CITY, STATE, and OCCUPATION were false, so CITY and STATE remain false in this example).

In some embodiments, for a single cohort ruleset, the process IDENTIFIES DISCLOSED ATTRIBUTES in 1308. If there are disclosed attributes, the process can, in some examples, EXTRACT COHORT PREDICATE in 1310 and UPDATE THE ATTRIBUTE DISCLOSURE RULE in 1312 for the cohort's disclosed attributes. This portion of the process can repeat until all of the cohorts have been used to update the disclosure rules at 1314.

Using the example in FIGS. 4A and 6, and assuming the following order of cohorts: $D_{111}$, $D_{112}$, $D_{12}$, $D_{21}$, $D_{22}$, FIG. 13C shows the evolution of the disclosure rules. In some embodiments, for the DT identified cohorts, attributes are disclosed once an equality condition is reached. In some embodiments, each distinct predicate is OR'ed together into a complex boolean expression. This places the disclosure rule in the Disjunctive Normal Form (DNF), that is the union of a series of intersections. In some examples, the second rule simplification sub-process, shown in the example of FIG. 13B, simplifies the DNF using DeMorgan's Law.

Figure 13B:
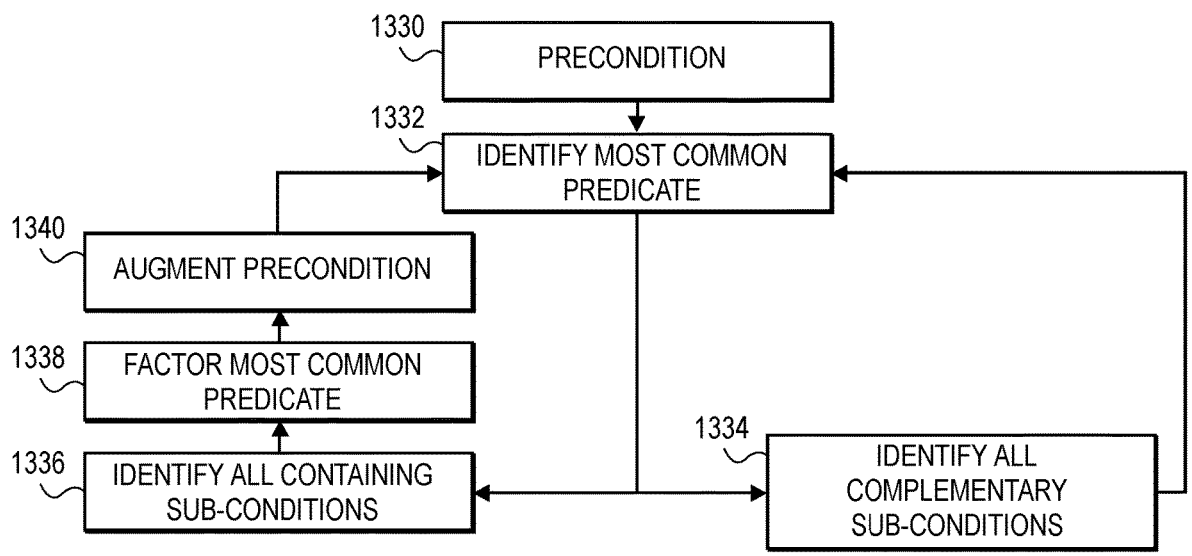

In some embodiments, the simplification process, shown in FIG. 13B, starts by defining some precondition in 1330. At the outset, this can be a NULL condition. Then, for a disclosure rule, the most common predicate can be identified in 1332. For example, using the following rule:
  ((A=X) AND (B=Y) AND (C=Z)) OR ((A=X) AND (B< >Y) AND (C=W)) OR ((A=X) AND (B=Y) AND (C=W)) OR ((A< >X) AND (B< >Y) AND (C< >W))

In some embodiments, (A=X) would be the most common predicate, occurring in three out of four sub-conditions. The sub-conditions are then split into those containing the most common predicate in 1336, and those not containing the most common predicate in 1334. For 1336, the most common predicate is factored out in 1338. In some embodiments, the precondition is augmented, taking the product of this and the PRECONDITION in 1330, with the results fed back into the simplification process. In some examples, the complementary conditions are also fed back into the simplification process, separately. The result can be a factored version of the predicate. Using the example above, after one iteration the rule becomes:
  (A=X) AND (((B=Y) AND (C=Z)) OR ((B< >Y) AND (C=W)) OR ((B=Y) AND (C=W))) OR ((A< >X) AND (B< >Y) AND (C< >W))
After the second iteration:
  (A=X) AND ((B=Y) AND ((C=Z) OR (C=W)) OR ((B< >Y) AND (C=W))) OR ((A< >X) AND (B< >Y) AND (C< >W))

In some embodiments, this is done for the disclosure rule for each attribute, simplifying the final disclosure condition.

Figure 14:
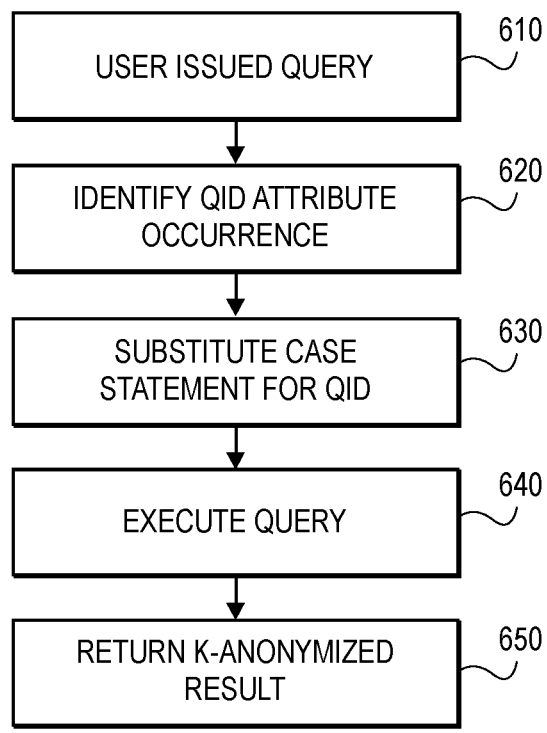
FIG. 14 illustrates an example sub-process according to embodiment disclosed herein.

Once the simplified disclosure rule set is in place, an end user can issue queries against a backing database 806, 816, 826 with a k-anonymization guaranteed in the answer (e.g., result 114) by utilizing the disclosure rule set. This is enabled using the rule application process 942, using for example, the subprocess shown in FIG. 14. In some examples as shown, the user can issue a query in 610. This system can identify, in some examples, occurrences of the QID attributes in the query in 620. This can be done using a query plan, generated by a database, or text patterns, among others. In some embodiments, anywhere the QID is referenced as CASE statement is substituted for the QID. As one example, in the query shown in FIG. 7, OCCUPATION, STATE, and CITY can be substituted using a CASE statement, such as:

CASE WHEN NOT (<SIMPLIFIED DISCLOSURE CONDITION>) THEN NULL ELSE value END as qid In some embodiments, by substituting this statement everywhere the QID is referenced (SELECT, WHERE, GROUP BY, or JOIN statements), the k-anonymity constraint is satisfied.

In some examples, a system for applying k-anonymity constraints on data sources can include a virtualized database, an initial configuration, a baseline cohort definition process, a disclosure rule definition process, a disclosure rule simplification process, a rule application process, and a computer-readable data storage device storing program instructions that, when executed by the one or more processors, cause the system to perform operations including querying data stored in a database, storing configuration patterns, measuring the frequency of non-overlapping records, splitting data into distinct groups, substituting text, and controlling a display or other device to show or use the measured impact.

In some examples, the system can obtain a user defined minimum value for k. In some examples, the system can obtain a list of quasi-identifying attributes. In some examples, the system can obtain a back-end defined maximum policy size. In some examples, the system can obtain a user defined maximum depth. In some embodiments, the operations can include a decision tree construction process, a rule extraction process, a rule simplification process, a rule application process, or a combination thereof.

In some embodiments, the operations can include identification of trivial cohorts. In some examples, the operations can include determining a measure of disclosure information gain. In some examples, the operations can include generating a count table measuring the most frequently occurring attribute. In some examples, the decision tree construction process can include an assessment of cohort size, an assessment of policy size, an assessment of tree depth, or a combination thereof. In some embodiments, the rule extraction process can include extraction of cohort criteria. In some examples, the operations can include identification of frequently occurring sub-conditions. In some examples, the operations can include a factorization and fragmentation process over frequently occurring sub-conditions. In some embodiments, the rule application process can include a query parser. In some examples, the rule simplification process can include an attribute substitution process.

Embodiments disclosed herein include creating a rule set that can be used to apply k-anonymity to an answer or result to a query sent to a relational database. The rule set includes rules that define which attributes of each record in the database need to be suppressed. This allows the operator of the database or others to easily determine which attributes need to be suppressed to apply the needed k-anonymity. Additionally, embodiments provide the technical advantage that the rule set can be updated when new records are added to and/or deleted from the database, such that an operator or user does not need to determine which attributes to suppress for queries made regarding the new records. For example, if a new record is added to a database with an age attribute having a value of 105, where age did not need to be suppressed because there were a sufficient number of each of the age values such that disclosure of the age attribute in an answer to a query did not cause the k anonymity value to fall below the threshold, and no other records in the database have an age attribute of 105, then disclosure of the age 105 in response to a query made regarding the new record could result in a loss of anonymity. However, the systems and methods disclosed herein will update the ruleset to suppress disclosure of the age 105 to maintain k-anonymity.

Further, embodiments automatically produce an answer or result that is transformed from the data set per query without creating unnecessary duplicates and the transformed data in the answer achieve a specified level of k-anonymity.

Further, in some embodiments, the k-anonymity can be adjusted or tuned by inputting a value for k into the system, which is used in developing the rule set. Furthermore, other inputs, such as tree depth and policy size, may be input into the system and used to develop the rule set, allowing a user to further tune and adjust the k-anonymity applied to the answer.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for anonymizing an answer to a query sent to a relational database, the system comprising:
   one or more hardware processors; and
   a non-transitory computer-readable data storage device storing program instructions that, when executed by the one or more hardware processors, cause the system to perform operations comprising:
   obtaining the query to the relational database, the relational database containing a plurality of records, each of the records having a plurality of attributes pertaining to a unique entity;
   determining a frequency of occurrence of the attributes in the relational database;
   creating an anonymization rule set based on the frequency of occurrence of the attributes, the anonymization rule set defining which attributes are to be suppressed in the answer to the query;
   generating the answer to the query using the anonymization rule set, wherein the answer to the query has k-anonymity; and
   controlling a display or other device based on the answer to the query.

2. The system of claim 1, wherein the program instructions further cause the system to perform operations for obtaining a setting for k, where k is a whole number of 2 or greater, and wherein creating the anonymization rule set comprises utilizing the setting for k in creating the anonymization rule set.

3. The system of claim 2, wherein creating the anonymization rule set based on the frequency of the attributes comprises determining a most frequently occurring one of the attributes in the dataset, and separating the records into a first group of records having the most frequently occurring attribute and a second group of records not having the most frequently occurring attribute.

4. The system of claim 3, wherein creating the anonymization rule set based on the frequency of the attributes further comprises separating the first group of records and the second group of records into at least one subgroup of records based on values of the attributes other than the most frequently occurring attribute.

5. The system of claim 4, wherein the setting for k is used to determine a number of the records contained in a smallest group or subgroup of the records.

6. The system of claim 4, wherein creating the anonymization rule set further comprises placing the first group of records, the second group of records and the subgroups of records into partition elements of a decision tree data structure, and extracting binary conditions for each of the partition elements, the binary conditions for each of the partition elements forming the rule set.

7. The system of claim 6, wherein the program instructions further cause the system to perform operations for receiving a setting for a maximum tree depth, and using the maximum tree depth to generate the rule set.

8. The system of claim 1, further comprising applying the rule set to a record pertaining to the query to generate the answer to the query with k-anonymity.

9. The system of claim 4, wherein the program instructions further cause the system to perform operations for receiving a setting for a maximum policy size, the maximum policy size defining an upper limit of a number of conditions to define a group or a subgroup of the records.

10. A method for applying k-anonymity to an answer to a query sent to a relational database comprising:
    obtaining the query to the relational database, the relational database containing a plurality of records, each of the records having a plurality of attributes pertaining to a unique entity;
    determining a frequency of occurrence of the attributes in the relational database;
    creating an anonymization rule set based on the frequency of occurrence of the attributes, the anonymization rule set defining which attributes are to be suppressed in the answer to the query;
    generating the answer to the query using the anonymization rule set, wherein the answer to the query has k-anonymity; and
    controlling a display or other device based on the answer to the query.

11. The method of claim 10, further comprising obtaining a setting for k, where k is a whole number of 2 or greater, and wherein creating the anonymization rule set comprises utilizing the setting for k in creating the anonymization rule set.

12. The method of claim 11, wherein creating the anonymization rule set based on the frequency of the attributes comprises determining a most frequently occurring one of the attributes in the dataset, and separating the records into a first group of records having the most frequently occurring attribute and a second group of records not having the most frequently occurring attribute.

13. The method of claim 12, wherein creating the anonymization rule set based on the frequency of the attributes further comprises separating the first group of records and the second group of records into a plurality of subgroups of records based on values of the attributes other than the most frequently occurring attribute.

14. The method of claim 13, wherein creating the anonymization rule set further comprises placing the first group of records, the second group of records and the subgroups of records into partition elements of a decision tree data structure, and extracting binary conditions for each of the partition elements, the binary conditions for each of the partition elements forming the rule set.

15. The method of claim 14, further comprising receiving a setting for a maximum tree depth, and using the maximum tree depth to generate the anonymization rule set.

16. The method of claim 13, further comprising using the setting for k to determine a number of the records contained in a smallest group or subgroup of the records.

17. The method of claim 10, further comprising applying the rule set to a record pertaining to the query to generate the answer to the query with k-anonymity.

18. The method of claim 13, further comprising receiving a setting for a maximum policy size, the maximum policy size defining an upper limit of a number of conditions to define a group or a subgroup of the records.

19. A non-transitory computer-readable medium storing instructions which, when executed by one or more processors of a system, cause the system to perform operations comprising:
    obtaining a query made to a relational database, the relational database containing a plurality of records, each of the records having a plurality of attributes pertaining to a unique entity;
    determining a frequency of occurrence of the attributes in the relational database;
    creating an anonymization rule set based on the frequency of occurrence of the attributes, the anonymization rule set defining which attributes are to be suppressed in an answer to the query;
    generating the answer to the query using the anonymization rule set, wherein the answer to the query has k-anonymity; and
    controlling a display or other device based on the answer to the query.

20. The non-transitory computer-readable medium of claim 19, wherein the instructions further cause the system to perform operations comprising determining a most frequently occurring one of the attributes in the dataset, and separating the records into a first group of records having the most frequently occurring attribute and a second group of records not having the most frequently occurring attribute.

* * * * *